June 10, 1941.   A. H. JUNG ET AL   2,245,275
METAL FEEDING APPARATUS
Filed March 13, 1941
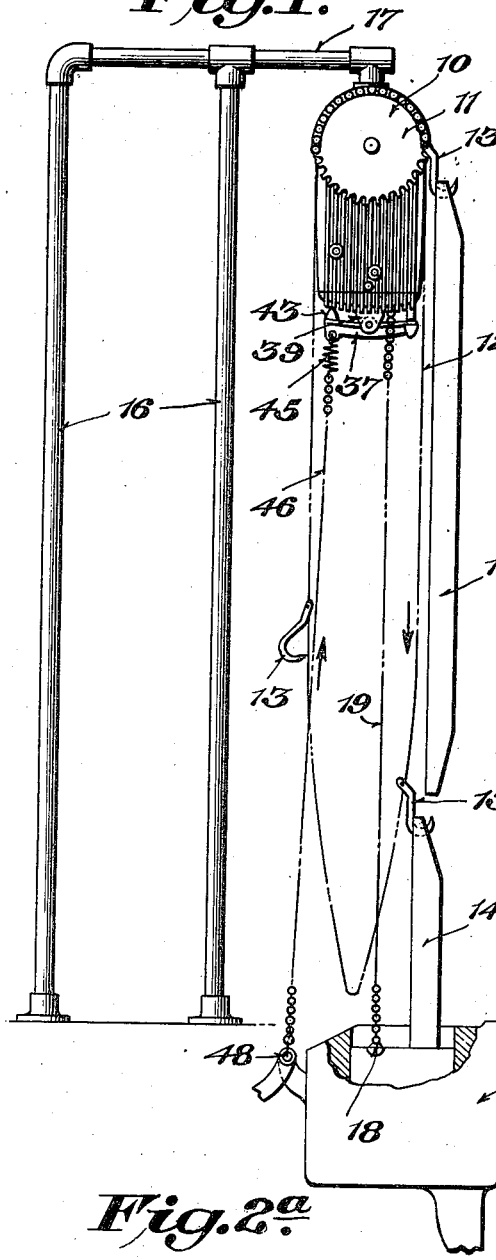
Fig.1.
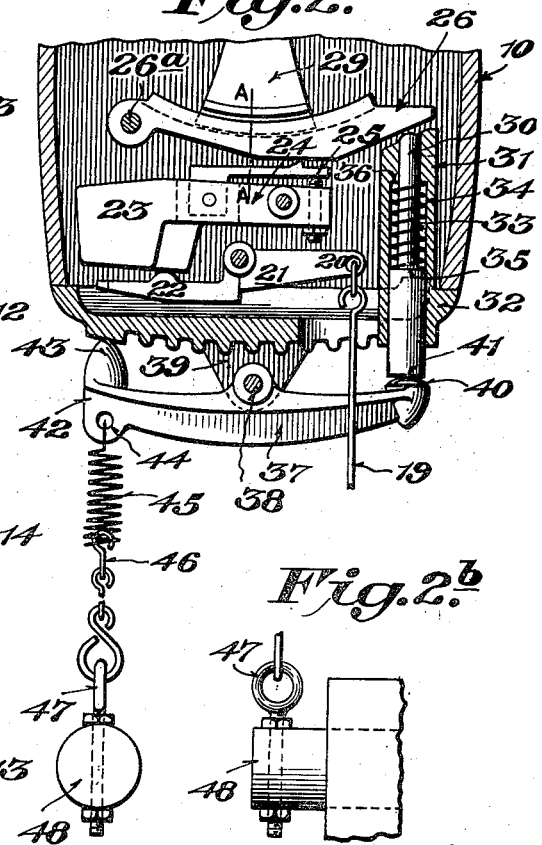
Fig.2.
Fig.2<sup>b</sup>.
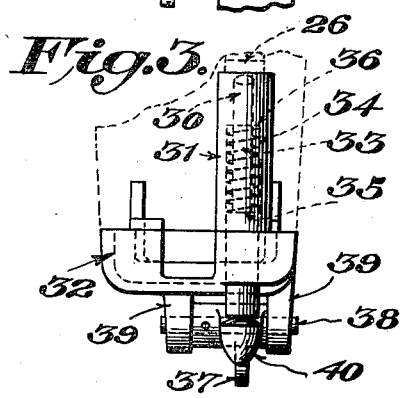
Fig.3.
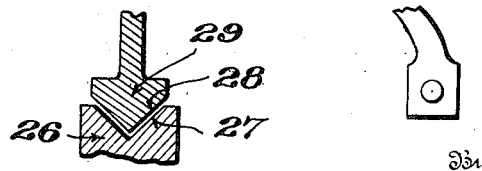
Fig.2<sup>a</sup>.
Inventors
ALBERT H. JUNG
EDWARD J. HUBELMEYER
By KARL W. FLOCKS
Attorney Patented June 10, 1941

2,245,275

UNITED STATES PATENT OFFICE 2,245,275

METAL FEEDING APPARATUS

Albert H. Jung, Flushing, N. Y., and Edward J. Hubelmeyer, Little Ferry, N. J., assignors to United American Metals Corporation, Brooklyn, N. Y., a corporation of New York Application March 13, 1941, Serial No. 383,220

7 Claims. (Cl. 22—80)

This invention relates to metal feeding and more particularly to the automatic lowering of metal ingots into a movable melting pot having a casting position and a rest or non-casting position.

Prior to the instant invention, various types of feeders have been proposed involving the feeding of metal to the melting pot in response to the actual movement of the melting pot. Such prior devices have included a connection between the melting pot and the feeder for effecting a feeding step upon movement of the pot to or from feeding position. These devices have been relatively complicated, expensive to manufacture, and subject to failure under operating conditions. In addition, these prior devices are not operative under all conditions to effect a predetermined level within the melting pot and there are times when the level within the pot is excessive or insufficient for casting purposes.

It is an object of the instant invention to teach a metal feeder and molten metal pot combination which will result in the proper feeding of metal to the pot and the maintenance of a predetermined level within the pot under casting conditions.

It is a further object of the instant invention to provide a relatively simple feeder and melting pot combination which will maintain a predetermined level within the melting pot irrespective of movement of the melting pot.

It is a still further object of the instant invention to provide a feeder and melting pot combination wherein the level within the melting pot is maintained by float control of the feeder and wherein the float control is rendered inoperative when the melting pot is moved away from casting position.

Other objects and the nature and advantages of the invention will be apparent from the following description taken in conjunction with the accompanying drawing, wherein:

Fig. 1 is a view in elevation of a feeder and melting pot combination in accordance with the instant invention;

Fig. 2 is a fragmentary view with parts broken away of a portion of the feeder and the pot position control for the feeder;

Fig. 2a is a fragmentary sectional view taken along lines A—A of Fig. 2 illustrating the engagement of the feeder brake with the feeder escapement check control;

Fig. 2b is a fragmentary view in elevation of the side of the hinge pin for the melting pot illustrating the connection leading to the brake actuating means; and, Fig. 3 is an end view of the pot controlled brake actuating means.

Referring to the drawing, the feeder 10, which may be as set forth in detail in applicants' United States Patent No. 2,215,043 issued September 17, 1940, comprises a sprocket wheel 11 on which is mounted an endless chain 12 to which is secured at spaced intervals the hooks 13 on which may be hung the metal ingots 14 adapted to be fed to the melting pot 15 to maintain a supply of molten metal therewithin. The feeder 10 is supported by the standards 16 and cantilever 17 above the melting pot 15 as shown. The float 18 is connected by the chain 19 to one end 20 of the lever 21, the opposite end 22 of which is adapted to engage the weighted end 23 of the lever 24, the opposite end 25 of which has a portion adapted to engage the brake lever 26 formed in its upper surface with a V-shaped groove 27 to correspond with the V-shaped surface 28 on the lower portion of the escapement check control 29. The escapement check control 29 is adapted to check the speed of the feeder which is influenced by the weight of the ingots 14 and the brake 26 is adapted to effect cessation of operation of the feeder by stopping the escapement check control 29.

Under normal operating conditions, when the level within the melting pot 15 is at a predetermined maximum, the float chain 19 will be slack and the end 22 of the lever 21 will drop, whereby the weighted end 23 of the lever 24 will also drop causing the actuating end 25 to engage the brake 26 which is pivoted at 26a to cause same to rotate in a counterclockwise direction and engage the escapement check control 29 to thereby effect cessation of operation of the feeder. When the melting pot 15 is in casting position and the level has dropped below the predetermined maximum which is desired, the float 18 will drop, effecting a pull on the float chain 19 which will cause lever 21 to rotate in a clockwise direction and lift the weighted end 23 of the lever 24 causing it to rotate in a clockwise direction, whereby the brake 26 will be released from engagement with the check control permitting same to operate and the feeder to lower the ingots 14 into the melting pot until the predetermined desired maximum level within same has been reached.

As the melting pot is adapted to be moved to a lower non-casting or rest position, if no further control of the feeder were provided, it will be readily apparent that an excessive amount of metal would be fed to the melting pot for the float 18 is arranged to fall with the melting pot when it is moved to its lower rest or non-casting position even though there were sufficient metal within the pot. Accordingly, a further actuating means for the escapement control brake is incorporated in the structure and comprises a pin 30 adapted to reciprocate within the upstanding generally cylindrical formation 31 which is integral with the casting 32 which forms the lower part of the feeder 10. The spring 33 within the enlarged bore 34 is adapted to urge the actuating pin 30 away from the brake 26, the spring 33 being under compression and engaging the shoulder 35 on the actuating pin 30 and the shoulder 36 at the uppermost end of the enlarged bore 34. The lever 37 is pivotally supported by the pin 38 mounted in bearings 39 formed integral with the casting 32 and one end 40 of the lever 37 is adapted to engage the lowermost end 41 of the actuating pin 30. The uppermost portion of the lever end 40 is rounded for good engagement in all positions with the pin 30. The opposite end 42 of the lever 37 is formed with a vertical extension 43 to effect a stop against the lower part of the casting 32 whereby the pin 30 may not fall out of the casting 32 of the feeder 10. The lowermost portion of the end 42 of the lever 37 is pierced at 44 whereby the spring 45 may have one end secured thereto. The lowermost end of the spring 45 is connected with the chain 46 which in turn is connected to the eye bolt 47 secured to the melting pot hinge pin 48, whereby any movement of the melting pot will be transmitted through the chain 46, the spring 45, the lever 37, to the pin 30. Thus, it will be seen that when the melting pot is lowered, the chain 46 will be pulled, the lever 37 will be rotated in a counter clockwise direction, to effect raising of the pin 30 into engagement with the brake 26 to effect cessation of operation of the feeder. Conversely, when the melting pot 15 is raised to its casting position, the chain 46 will be slack, and the weight of the pin 30 together with the spring 34 will act to rotate the lever 37 in a counter clockwise direction until the stop 43 engages the lowermost portion of the casting 32. In this position the pin 30 effects no control of the brake 26, the entire control of the feeder being effected by the float 18, the melting pot 15 being in its casting position.

It will be readily apparent and understood from the above description of the feeder and melting pot combination and its operation that the proper level of molten metal within the melting pot will be maintained under all operating conditions and further that the level will not become excessive or depleted so as to be insufficient because of movement of the melting pot to rest or non-casting position so as to change the relative location of the float with respect to the desired level to be maintained within the melting pot. Not only are proper operating conditions maintained under all conditions but the structure in accordance with the invention which effects the desired results is relatively simple, may be readily manufactured, and is capable of effecting the desired results under operating conditions.

It will be obvious to those skilled in the art that various changes may be made in this device without departing from the spirit of the invention, and that, therefore, the invention is not limited to what is shown in the drawing and described in the specification, but only as indicated in the appended claims.

What is claimed is:

1. In a metal feeder combination, a molten metal pot adapted to be moved into casting position and into non-casting position, means for feeding metal into said pot, means responsive to the level of molten metal within said pot for stopping and releasing said metal feeding means, means responsive to the position of said pot for effecting cessation of operation of said feeding means independently of said level responsive means.

2. In a metal feeder combination, a melting pot adapted to be moved into an upper casting position and into a lower non-casting position, means for feeding solid metal to said melting pot, float means responsive to the level of molten metal within said pot for controlling the operation of said solid metal feeding means, means actuated by movement of said pot to its lowermost position for stopping said feeding means independently of said float means.

3. In a metal feeder combination, a melting pot adapted to be moved into an upper casting position and into a lower non-casting position, means for feeding solid metal to said melting pot comprising an escapement check control, a brake for said escapement control, a first lever for actuating said brake, float means responsive to the level of molten metal within said pot for controlling said lever in a manner to actuate said brake when the level within said pot reaches a predetermined maximum and to release said brake when the level is below said predetermined maximum, a second actuator for said brake, a second lever for controlling said actuator, means connecting said lever with said pot in a manner whereby when said pot is in its lowermost position said second actuator will operate said brake and effect cessation of operation of said feeder.

4. In a metal feeder combination, a metal feeder element comprising an escapement check control, a brake for braking said escapement check control, two actuators for said brake, a movable melting pot positioned below said feeder and adapted to receive metal from said feeder, the first of said actuators being responsive to the position of said melting pot and the second of said actuators being responsive to the level of molten metal within said pot.

5. The structure recited in claim 4, the first of said actuators being operative to effect braking action when said pot is moved away from said feeder and to release said brake when said melting pot is moved closest to said feeder.

6. In a metal feeder combination, means for feeding metal downwardly, a melting pot positioned below said feeder for receiving the metal from said feeding means, said melting pot being adapted to be moved further away from or closer to said feeding means, means responsive to the level of molten metal within said melting pot when it is closest to said feeding means for controlling said feeding means, means acting concurrently with movement of said melting pot from its closest position for rendering ineffective said level responsive control means.

7. In a metal feeder combination, means for feeding metal to a melting pot, said melting pot being adapted to be moved to at least two positions each of which are different with relation to the position of said feeding means, means responsive to the level of molten metal within said melting pot when it is in one of said positions for controlling said feeding means, and means acting concurrently with movement of said melting pot from said one position for rendering ineffective said level responsive control means.

EDWARD J. HUBELMEYER.
ALBERT H. JUNG.